United States Patent
Bochenek (10) Patent No.: US 10,384,612 B2
(45) Date of Patent: Aug. 20, 2019

(54) DYNAMIC CAMERA VIEW TO AID WITH TRAILER ATTACHMENT

(71) Applicant: Robert Bosch GmbH, Stuttgart (DE)

(72) Inventor: Jeffrey A. Bochenek, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 15/307,259

(22) PCT Filed: Jul. 9, 2014

(86) PCT No.: PCT/US2014/045868
§ 371 (c)(1),
(2) Date: Oct. 27, 2016

(87) PCT Pub. No.: WO2015/171168
PCT Pub. Date: Nov. 12, 2015

(65) Prior Publication Data
US 2017/0050567 A1    Feb. 23, 2017

Related U.S. Application Data (60) Provisional application No. 61/992,419, filed on May 13, 2014, provisional application No. 61/989,024, filed on May 6, 2014.

(51) Int. Cl.
*B60R 1/00* (2006.01)
*B60K 35/00* (2006.01)
(Continued)

(52) U.S. Cl.
CPC .............. *B60R 1/003* (2013.01); *B60K 35/00* (2013.01); *G06F 3/0488* (2013.01);
(Continued)

(58) Field of Classification Search
CPC .............. B60R 1/003; B60R 2300/808; B60K 2350/1028; B60K 35/00; G06K 9/00791;
(Continued)

(56) References Cited

U.S. PATENT DOCUMENTS 6,765,607 B2   7/2004   Mizusawa et al.
7,777,615 B2   8/2010   Okuda et al.
(Continued)

FOREIGN PATENT DOCUMENTS

CN   101915990 A   12/2010
CN   101945256 A   1/2011
(Continued)

OTHER PUBLICATIONS

International Search Report and Written Opinion for Application No. PCT/US2014/045868 dated Apr. 1, 2015 (8 pages).
(Continued)

*Primary Examiner* — Allen C Wong
(74) *Attorney, Agent, or Firm* — Michael Best & Friedrich LLP (57) ABSTRACT

Methods and systems for assisting a driver when coupling a vehicle to a trailer. One method includes (a) obtaining image data of an area to the rear of the vehicle, (b) identifying at least a portion of the trailer based on the image data, (c) determining a distance between the vehicle and the identified portion of the trailer, (d) determining a perspective based on the determined distance, (e) generating, with a controller included in the vehicle, a view of the trailer based on the image data, the view having the determined perspective, and (f) displaying the generated view. The method also includes (g) repeating (c) through (f) as the vehicle nears the trailer, wherein the determined perspective changes as the vehicle gets closer to the trailer.

19 Claims, 8 Drawing Sheets

(51) Int. Cl.
*G06F 3/0484* (2013.01)
*G06F 3/0488* (2013.01)
*G06K 9/00* (2006.01)
*H04N 5/232* (2006.01)
*H04N 7/18* (2006.01)

(52) U.S. Cl.
CPC ..... *G06F 3/04842* (2013.01); *G06K 9/00791* (2013.01); *H04N 5/23296* (2013.01); *H04N 7/183* (2013.01); *B60K 2350/1028* (2013.01); *B60R 2300/808* (2013.01)

(58) Field of Classification Search
CPC .. G06F 3/0488; G06F 3/04842; G06F 3/0481; H04N 7/183; H04N 5/23296
USPC ......................................................... 348/118
See application file for complete search history.

(56) References Cited

U.S. PATENT DOCUMENTS

| | | | |
|---|---|---|---|
| 2002/0149673 A1 | 10/2002 | Hirama et al. | |
| 2005/0074143 A1 | 4/2005 | Kawai | |
| 2007/0058273 A1 | 3/2007 | Ito et al. | |
| 2008/0231701 A1 | 9/2008 | Greenwood et al. | |
| 2010/0324770 A1* | 12/2010 | Ramsey | B60D 1/36 701/25 |
| 2012/0200706 A1* | 8/2012 | Greenwood | B60R 1/00 348/148 |
| 2013/0226390 A1* | 8/2013 | Luo | B60D 1/36 701/25 |
| 2014/0160276 A1* | 6/2014 | Pliefke | B60R 1/00 348/118 |
| 2014/0200759 A1* | 7/2014 | Lu | B60D 1/245 701/28 |

FOREIGN PATENT DOCUMENTS

| | | |
|---|---|---|
| CN | 103010115 A | 4/2013 |
| EP | 2620326 A1 | 11/2012 |

OTHER PUBLICATIONS

Office Action from the State Intellectual Property Office of the People's Republic of China for Application No. 201480078550.3 dated Dec. 3, 2018 (9 pages).

* cited by examiner

DYNAMIC CAMERA VIEW TO AID WITH TRAILER ATTACHMENT

RELATED APPLICATIONS

This application claims priority to U.S. Provisional Application No. 61/989,024, filed May 6, 2014 and U.S. Provisional Application No. 61/992,419, filed May 13, 2014, the entire content of each application is incorporated by reference herein.

FIELD

Embodiments of the present invention relate to methods and systems for assisting a driver in aligning a vehicle hitch with a trailer coupler (or coupling).

BACKGROUND

In a passenger vehicle, the trailer hitch is usually located low on the rear of the vehicle in a position that is not visible by the driver. The trailer coupling of a trailer that connects to the hitch is located in a similarly low position. To connect the vehicle to the trailer, a driver must position the vehicle such that the trailer hitch is relatively close to the trailer coupling without the benefit of being able to directly view the trailer hitch, the trailer coupling, of any obstructions that may be positioned between the trailer hitch and the trailer coupling. Also, automating this alignment process (e.g., through automatically steeling the vehicle) requires precision. For example, to prevent damage to the vehicle and the trailer, positions of the hitch and coupling must be accurately tracked with limited variances, unlike other automatic vehicle maneuvers, such as parallel parking assistance. Therefore, automated systems for hitch attachment are complex and, consequently; costly to develop.

SUMMARY

Accordingly, embodiments of the invention provide systems and methods for assisting a driver in aligning a vehicle hitch with a trailer coupler. One system includes an image capture device having a field-of-view including an area to the rear of the vehicle. The system also includes a controller configured to analyze image data from the image capture device and detect a trailer or a portion thereof located in the area (e.g., a trailer tongue or coupling). The controller is also configured to determine a distance between the vehicle and the detected trailer as the vehicle moves toward the trailer and automatically change a perspective of the image capture device based on determined distances.

Similarly, one method includes obtaining, by a controller, image data from an image capture device having a field-of-view including an area to the rear of the vehicle and analyzing, by the controller, the image data to detect at least a portion of a trailer located in the area. The method also includes determining a distance: between the vehicle and the detected trailer as the vehicle moves toward the trailer and automatically, by the controller, changing a perspective of the image capture device based on determined distances.

For example, one embodiment of the invention provides a method of assisting a driver when coupling a vehicle to a trailer. The method includes (a) obtaining image data of an area to the rear of the vehicle, (b) identifying at least a portion of the trailer based on the image data, (c) determining a distance between the vehicle and the identified portion of the trailer, (d) determining a perspective based on the determined distance, (e) generating, with a controller included in the vehicle, a view of the trailer based on the image data, the view having the determined perspective, and (f) displaying the generated view. The method also includes (g) repeating (c) through (f) as the vehicle nears the trailer, wherein the determined perspective changes as the vehicle gets closer to the trailer.

Another embodiment of the invention provides a system for assisting a driver when coupling a vehicle to a trailer. The system includes an image capture device, a user interface, and at least one controller. The image capture device is configured to capture image data of an area to the rear of the vehicle. The user interface is included in the vehicle. The at least one controller is configured to (a) obtain the image data, (b) identify at least a portion of the trailer based on the image data, (c) determine a distance between the vehicle and the identified portion of the trailer, (d) determine a perspective based on the determined distance, (e) generate a view of the trailer based on the image data, the view having the determined perspective, and (f) display the view on the user interface. The at least one controller is also configured to repeat (c) through (f) as the vehicle nears the trailer, wherein the determined perspective changes as the vehicle gets closer to the trailer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and Should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical of mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, tin purposes of discussion, may be illustrated and described as if the majority of the components were implemented solely in hardware. However, one of ordinary Skill in the art, and based on a reading of this detailed description, would recognize that, in at least one embodiment the electronic based aspects of the invention may be implemented in software (e.g., stored on non-transitory computer-readable medium) executable by one of more processors. As such, it should be noted that a plurality of hardware and software based devices, as well as a plurality of different structural components may be utilized to implement the invention. For example, "control units" and "controllers" described in the specification can include standard processing components, such as one or mane processors, one or more memory modules including non-transitory computer-readable medium, one or more input/output interfaces, and various connections (e.g., a system bus) coupling the components.

Figure 1:
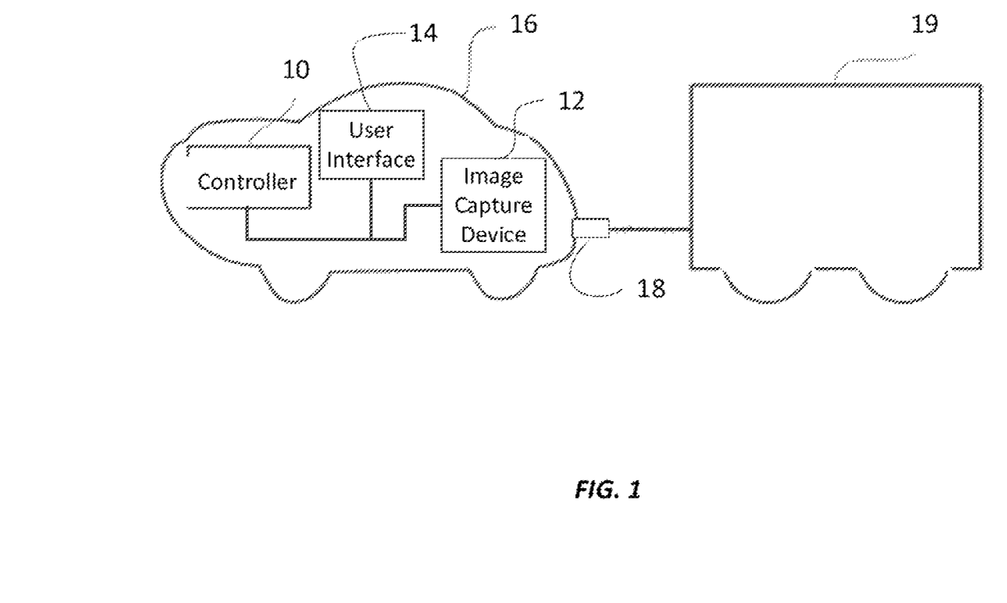
FIG. 1 schematically illustrates a vehicle and a trailer.

As noted above, embodiments of the invention provide systems and methods for assisting a driver in positioning a vehicle such that a trailer hitch of the vehicle is properly aligned with a trailer coupling of a trailer. As illustrated in FIG. 1, one system can include a controller 10, an image capture device 12, and a user interface 14. The controller 10, image capture device 12, and user interface 14 are included in a vehicle 16 that includes a hitch 18 for coupling a trailer 19 to the vehicle 16.

Figure 2:
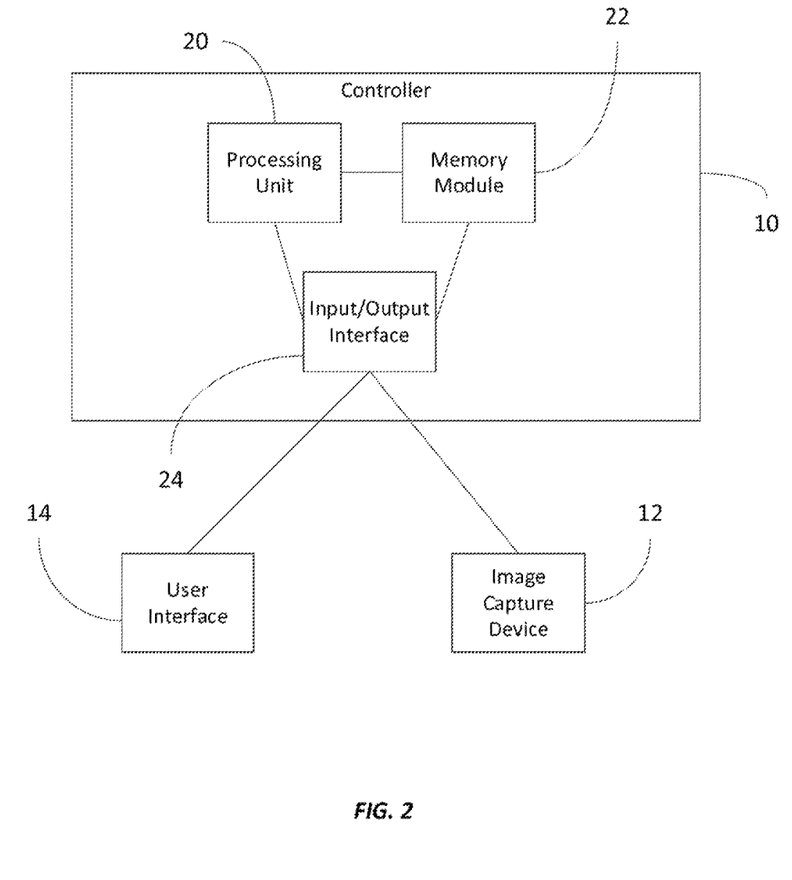
FIG. 2 schematically illustrates a controller included in the vehicle of FIG. 1.

As illustrated in FIG. 2, the controller 10 includes a processing unit 20 (e.g., a microprocessor, an application specific integrated circuit ("ASIC"), etc.), one or more memory modules 22, and an input/output interface 24. It should also be understood that the controller 10 can include additional components other than those described herein. Furthermore, in some embodiments, the functionality of the controller 10 (described below) can be distributed among multiple systems or devices. Also, in some embodiments, the functionality of the controller 10 can be combined with other systems or devices.

The memory modules 22 include non-transitory computer-readable media, such as random-access memory ("RAM") and/or read-only memory ("ROM"). The processing unit 20 obtains data from devices and systems external to the controller 10 droller the input/output interface 24 over one or more wired or wireless connections (e.g., a controller area network ("CAN") bus). For example, the controller 10 receives input from the image capture device 12 through the input/output interface 24. Similarly, the controller 10 can be configured to provide output to the user interface 14 through the input/output interface 24.

The processing unit 20 receives information (e.g., from the memory modules 22 and/or the input/output interface 24) and processes the information by executing one or more instructions. The instructions are stored in the memory modules 22. The processing unit 20 also stores information (e.g., information received through the input/output interface 24 and/or information generated by instructions executed by the processing unit 20) to the memory modules 22. The instructions stored in the memory modules 22 provide particular functionality when executed by the processing unit 20. In general, the instructions, when executed by the processing unit 20, use information from the image capture device 12 to provide a driver of the vehicle 16 with an image an area to the rear of the vehicle 16 to assist the driver in coupling the trailer 19 to the hitch 18 of the vehicle 16.

The image capture device 12 includes at least one image sensor (e.g., a still or video color or monochrome camera) and, in some embodiments, includes a processing unit (e.g., a dedicated controller) configured to process image data captured by the at least one image sensor (e.g., distortion correction, image stitching, etc.). The at least one image sensor included in the image capture device can have a field-of-view that includes an area to the rear of the vehicle 16 (i.e., where the hitch 18 is located).

The image capture device 12 provides image data to the controller 10 (e.g., over a wired or wireless connection, including a direct link or a bus or network connection, such as a controller area network ("CAN") bus). The controller processes the image data as described in more detail below. The controller 10 also outputs received image data (e.g., as received from the image capture device and/or after processing) to the user interface 14. In some embodiments, the image capture device 12 provides image directly to the user interface as an alternative or in addition to providing the image data to the controller 10. Also, in some embodiments, the controller 10 is included in the image capture device 12 and/or the user interface 14.

The user interface 14 includes at least one display included in the interior of the vehicle 16 (e.g., in a vehicle's dashboard and/or center console). In some embodiments, the user interface 14 includes a touchscreen. Alternatively or in addition, the user interface 14 can be associated with one or more input mechanisms (e.g., buttons, dials, switches, cursors, etc.) that allow a user to interact with the image data and other information displayed on the user interface 14.

Figure 3:
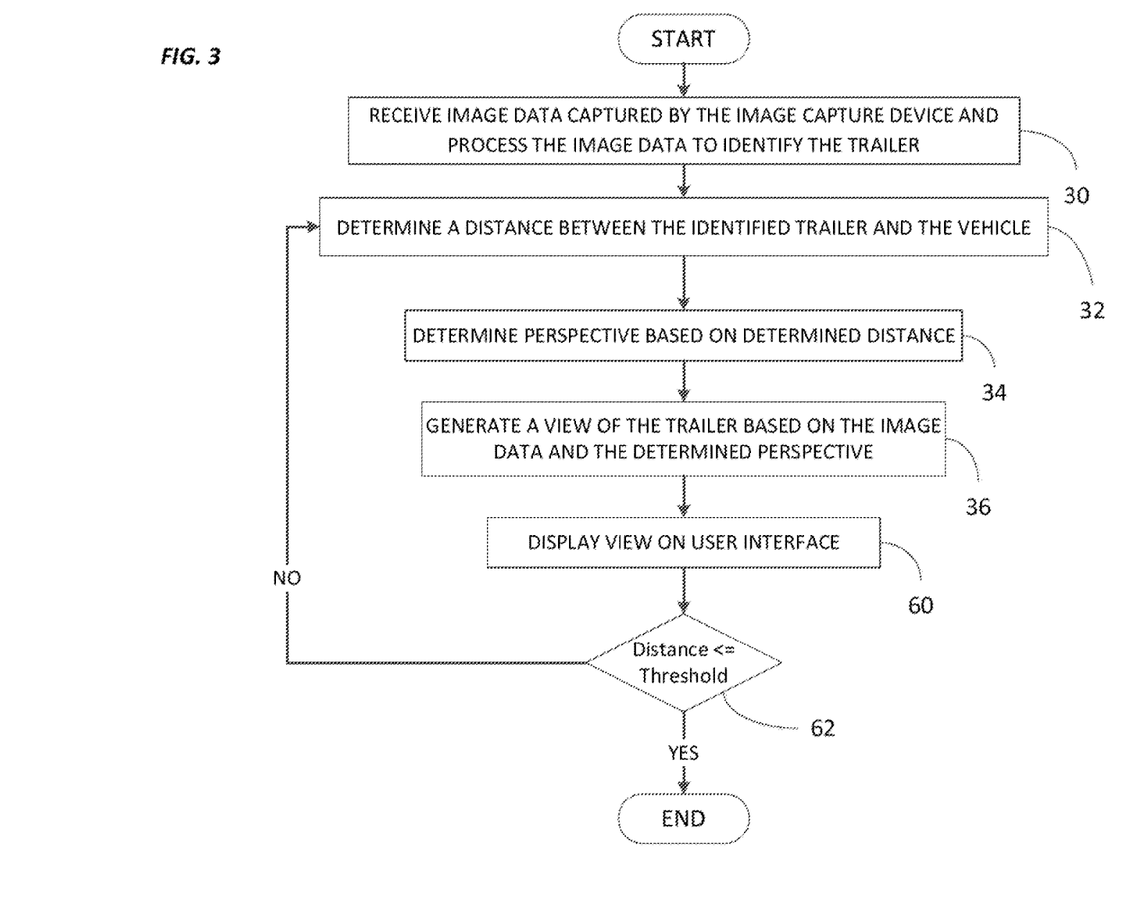
FIG. 3 is a flowchart illustrating a method of assisting a driver of the vehicle of FIG. 1 performed by the controller of FIG. 2 to connect the vehicle to a trailer.

The controller is configured (through instructions stored in the memory module 22 and executed by the processing unit 20) to assist a driver of the vehicle 16 when the driver is attempting to connect the trailer 19 to the hitch 18 of the vehicle 16. The method performed by the controller 10 uses image data captured by the image capture device 12 to track the location of the trailer 19 (e.g., the trailer coupling) through a changing scene (i.e., a changing background). FIG. 3 illustrates one embodiment of this method. As illustrated in FIG. 3, the method includes receiving, by the controller 10, image data captured by the image capture device 12 and processing the image data to identify the trailer 19 or a portion thereof (e.g., the trailer coupling, trailer tongue, marked affixed to the trailer 19, etc.) within the image data (at block 30). In some embodiments, the controller 10 identifies the trailer 19 by performing automatic image data processing that looks for particular shapes or other unique characteristics commonly associated with a trailer in an image. To make such automatic detection easier, the controller 10 can be configured to look for the trailer 19 a predetermined distance from the vehicle 16 (e.g., approximately 3.0 meters to approximately 5.0 meters). The controller 10 can also be configured to detect a predefined marker placed on the trailer 19 (e.g., a sticker or other device attached to the trailer 19 that has a predetermined shape, pattern, etc.).

In other embodiments, the controller 10 displays the captured image data on the user interface 14 and allows a user to manually select or identify the trailer 19 within the displayed image data. For example, if the user interface 14 includes a touchscreen a user can manually touch a location on the displayed image data that corresponds to the trailer 19 (e.g., the trailer coupling). Alternatively or in addition, a user can use input mechanisms associated with the user interface 14 (e.g., a button, a cursor, a stylus, etc.) to specify a particular location on the displayed image data that corresponds to the trailer 19. Also, in some embodiments, the controller 10 can be configured to automatically identify the trailer 19 in the image data and display the image data with an indication of the automatic identification on the user interface 14. The user can then confirm or reject the automatic identification and either request that the controller 10 attempt the automatic identification again or manually indicate (e.g., move the indication or generate a new indication) the location of the trailer 19 within the image data.

After the controller 10 identifies the trailer 19 in the image data, the controller 10 determines a distance between the identified trailer 19 and the vehicle 16 (at block 32). In some embodiments, the controller 10 uses the received image data to calculate the distance (e.g., by calculating a distance between the image capture device 12 and an object represented in the captured image data using known parameters of the image capture device 12). Alternatively or in combination, the controller 10 can use data from a distance-measuring system to calculate the distance. For example, the controller 10 can be configured to communicate with one or more distance-measuring systems included in the vehicle 16 such as a radar or ultrasonic device, that can measure distances between the vehicle 16 and external objects. Also, in some embodiments, a user can input a distance and/or confirm a calculated distance using the user interlace 14. It should be understood that the determined distance can include a distance between a particular portion of the vehicle 16 (e.g., the image capture device 12, a rear bumper of the vehicle 16, the trailer hitch 18, etc.) and a particular portion of the trailer 19 (e.g., a trailer tongue, an end of the trailer coupling closest to the vehicle 16, the rear surface of the trailer body, a trailer wheel, etc.). For example, the controller 10 can configured to use predetermined dimensions for various aspects of the vehicle 16 (and/or various aspects of common trailers) to accurately determine a distance between the vehicle 16 and the trailer 19.

As described in more detail below, the controller 10 is configured to initially determine the distance between the vehicle 16 and the trailer 19 and repeatedly determine this distance as the vehicle 16 moves. Alternatively or in addition, the controller 10 can be configured to initially determine the distance between the vehicle 16 and the trailer 19 and automatically adjust the distance based on the movement of the vehicle 16 (e.g., a speed, acceleration and/or direction of travel of the vehicle 16). In such embodiments, the controller 10 can be configured to communicate with one or more vehicle systems that provide vehicle operating parameters (e.g., speed, velocity, gear selection, etc.) for determining movement of the vehicle 16.

The controller 10 uses the calculated distance and the image data to generate a view of the rear of the vehicle 16. In particular, the controller 10 can be configured to use a particular perspective for the generated view depending on the current distance between the vehicle 16 and the trailer 19. For example, the controller 10 can be configured to automatically change the perspective of the generated view from a first view having a first perspective of approximately 45° to approximately 90° from the ground or driving surface of the vehicle to a second view having a second perspective of approximately 0° from the ground (and, optionally, providing additional perspectives between the first and the second view). It should be understood that this change in perspective can occur in one or more steps (e.g., a few degrees over predetermined period of time) or continuously.

In some embodiment, the controller 10 uses the determined distance between the vehicle 16 and the trailer 19 to determine a perspective (at block 34). In particular, the controller 10 can store a table or other model or function that maps distances to perspectives. In some embodiments, the table maps each of a plurality of distances (e.g., individual distances or distance ranges) to a predetermined perspective. Therefore, after the controller 10 determines a distance between the vehicle 16 and the trailer 19, the controller 10 can access the table and select a perspective included in the table that corresponds to the one of the plurality of distances matching the determined distance. For example, the controller 10 can be configured to use the first view when the vehicle 16 is located more than approximately 5.0 meters from the trailer 19 and can be configured to use the second view when the vehicle 16 is located less than approximately 1.0 meter from the trailer 19. Therefore, the controller 10 uses the determined distance between the vehicle 16 and the trailer 19 as described above to identify a perspective.

The controller 10 then generates the view based on the determined perspective (at block 36). For example, in some embodiments, the controller 10 changes the perspective of the generated view by automatically changing the physical configuration of the image capture device 12 (e.g., using motors or other mechanisms that change the device's linear position, angular position, etc.). For example, if the controller 10 determines, based on the calculated distance between the vehicle 16 and the trailer 19, that a perspective of approximately 30° from ground is warranted (to provide a clear view of the hitch 18), the controller 10 can operate one or more motors or other device to rotate the image capture device 12 such that the device 12 captures such a perspective.

Figure 4:
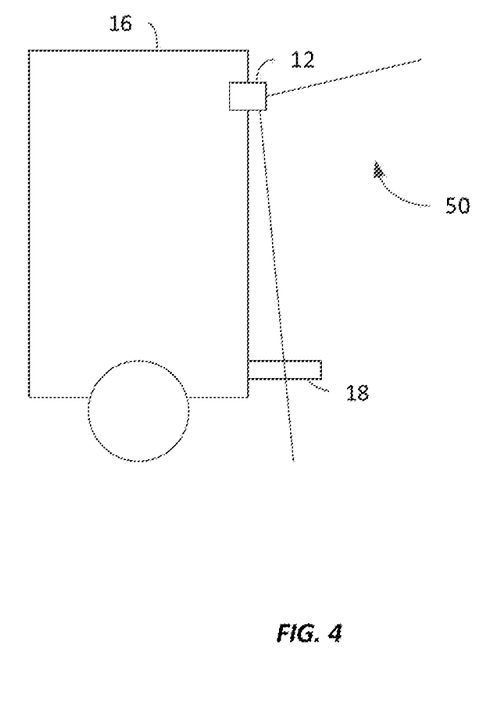
FIG. 4 schematically illustrates an image capture device included in the vehicle having a fixed physical location.

In other embodiments, the controller 10 changes the perspective of the generated view by modifying the image data collected by the image capture device 12. For example, U.S. Published Application No. 2011/0050886, the entire content of which is hereby incorporated by reference, provides one configuration for providing such image processing. This incorporated patent application discloses systems and methods change a camera view dynamically. For example, as illustrated in FIG. 4, the image capture device 12 can have a fixed physical position on the vehicle 16 that provides a fixed field-of-view 50. This field field-of-view 50 can provide a view such as the view 52 illustrated in FIG. 5. However, using the systems and methods disclosed in U.S. Published Application No. 2011/0050886 or other similar methods, the controller 10 can generate a simulated location of the image capture device 12' (see FIG. 6) that provides a simulated field-of-view 54. This simulated field-of-view 54 can provide a view such as view 56 illustrated in FIG. 7 (e.g., a top or bird's-eye-view). Therefore, although the physical position of the image capture device 12 does not change, the controller 10 can generate a simulated field-of-view as if the device's position physically changed.

Alter generating the view with the determined perspective, the controller 10 displays the generated view on the user interface 14 (at block 60). Accordingly, the view displayed by the controller 10 dynamically varies based on a distance to the trailer 19. In particular, the closer the vehicle 16 moves to the trailer 19, the more the simulated field-of-view or perspective approaches being perpendicular to the gonad, which provides a top or bird's-eye-view of the trailer 19 (e.g., the trailer ball and trailer tongue) (see FIG. 7). This top perspective is particularly helpful with any backing maneuver but especially when trying to couple the trailer 19 to the hitch 18.

Figure 8:
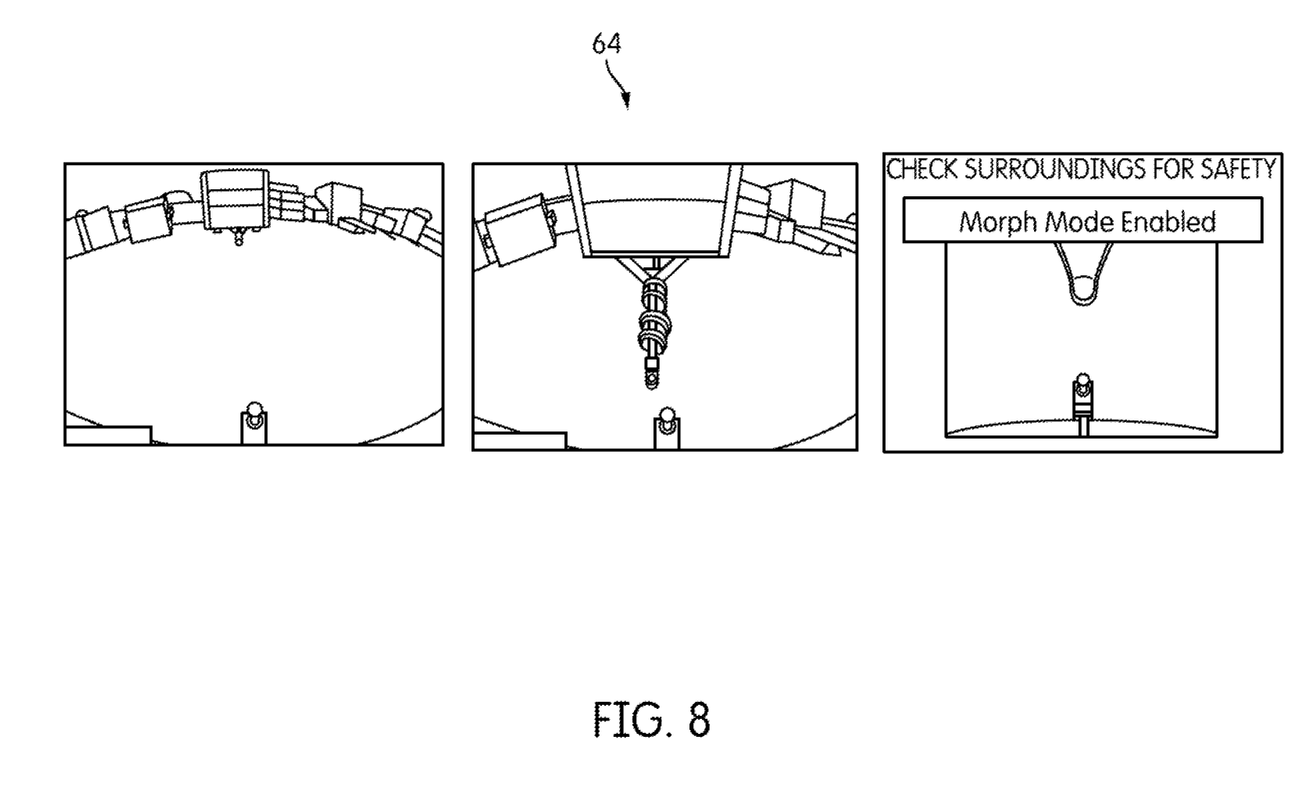
FIG. 8 is a sequence of views generated by the controller of FIG. 2.

Accordingly, after determining the initial distance between the vehicle 16 and the trailer 19, the controller 10 can be configured to generate an initial view have a first perspective (e.g., a perspective provided by the image capture device 12). Thereafter, as Illustrated in FIG. 3, as the vehicle 16 moves, the controller 10 can be configured to determine a new distance between the vehicle 16 and the trailer 19 (e.g., by sensing a new distance or by adjusting the initially determined distance) and generate a new view having a perspective that depends on the new distance. The controller 10 can repeat this process until the distance between the vehicle 16 and the trailer 19 reaches a predetermined minimum distance (at block 62) (or until a predetermined perspective, such as a bird's-eye-view perspective is reached). For example, FIG. 8 illustrates a sequence 64 of views displayed to a driver as the vehicle 16 nears the trailer 19. It should be understood that the sequence 64 can include only some of the views and additional or fewer views can be presented in particular situations.

Figure 5:
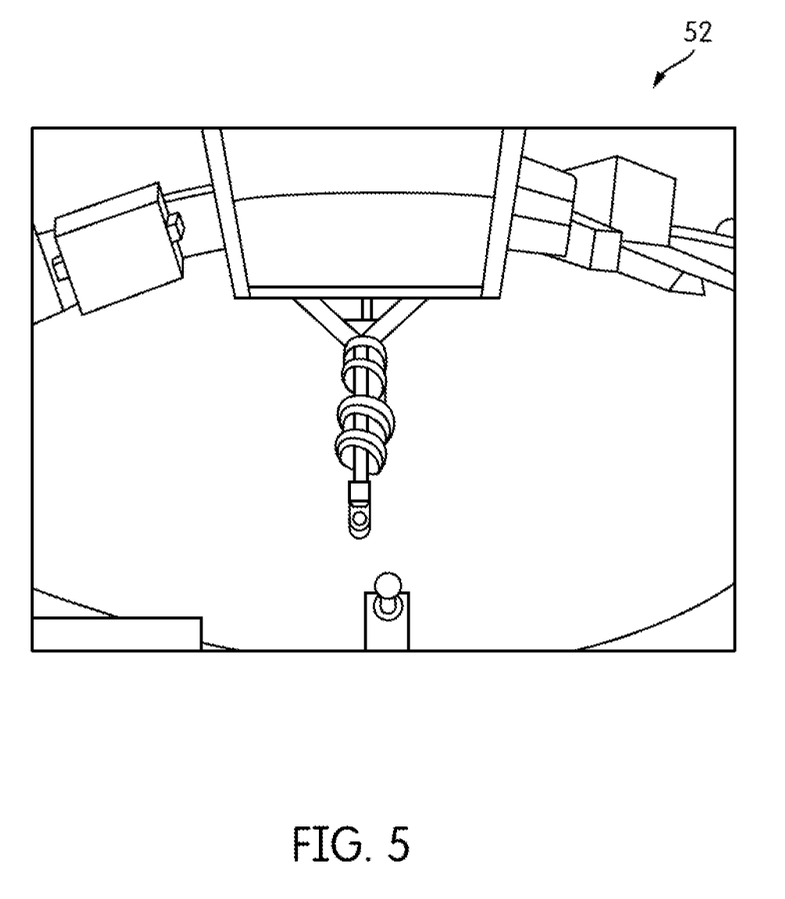
FIG. 5 is a view generated by image data collected by the image capture device of FIG. 4 at the fixed physical location.
Figure 6:
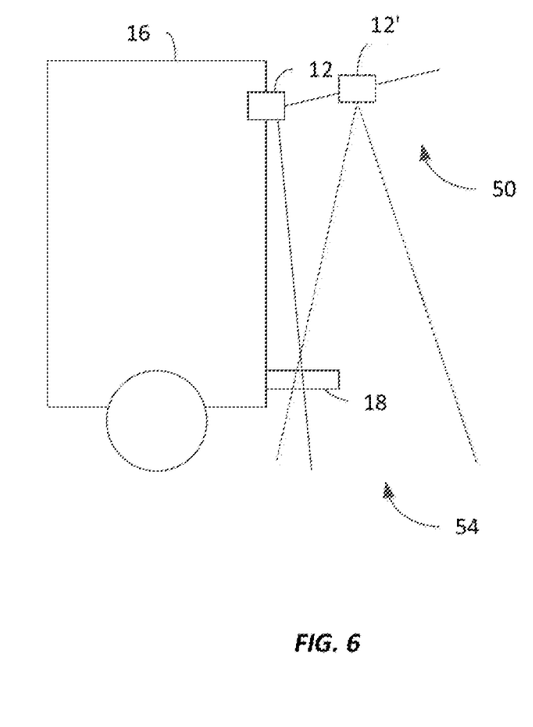
FIG. 6 schematically illustrates an image capture device included in the vehicle having a simulated location.
Figure 7:
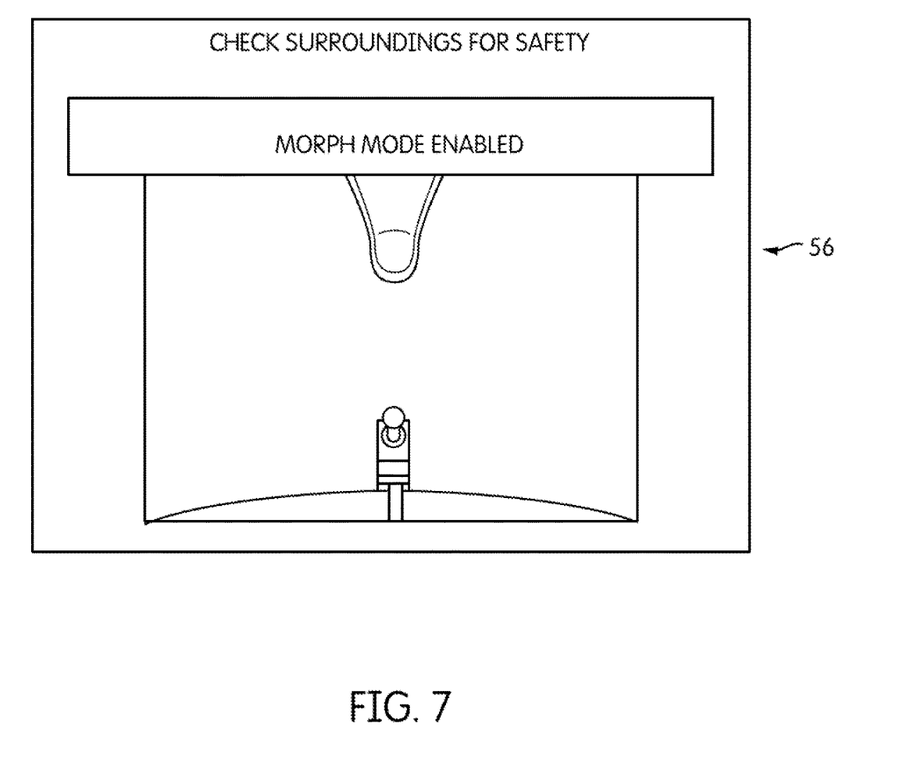
FIG. 7 is a view generated by image data collected by the image capture device of FIG. 4 at the simulated location.

In some embodiments, the controller 10 also provides guidance to the driver while the vehicle moves toward the trailer. For example, as illustrated in FIGS. 5 and 7, in some embodiments, the controller 10 marks the trailer 19 on the displayed view (see, for example, the red dot superimposed on the trailer tongue) that was automatically or manually identified within the displayed image data. The guidance can also include audible guidance (e.g., spoken text, such as "turn wheel left," "turn wheel right," or "reduce speed, warning tones of alarms, etc.) and/or visual guidance (e.g., markings, such as guidelines or projected vehicle trajectories displayed on image data or a separate user interface). In some embodiments, the controller 10 can also be configured to automatically stop the vehicle 16 if the vehicle 16 (e.g., the hitch 18) gets too close to the trailer 19 such that the vehicle 16 may collide with the trailer 19. Accordingly, the controller 10 can be configured to prevent or mitigate a collision between the vehicle 16 and the trailer 19. However, in other embodiments, during the assistance method, the driver maintains control of the vehicle 16 (e.g., through the steering wheel, gas, brake, etc.).

Thus, embodiments of the invention provide methods and systems for providing a driver with a view that aids the driver in coupling the vehicle to a trailer. For example, as a vehicle moves toward a trailer (e.g., in reverse), the driver is presented with a dynamically-changing perspective of the trailer, which allows the driver to more accurately track the location of the trailer (i.e., the trailer coupling). In particular, the perspective of the view can change as the vehicle nears the trailer to eventually provide a top or bird's-eye-view of a vehicle hitch.

Various features and advantages of the invention are set forth in the following claims.

What is claimed is:

1. A method of assisting a driver when coupling a vehicle to a trailer, the method comprising:
   (a) obtaining image data of an area to the rear of the vehicle;
   (b) identifying at least a portion of the trailer based on the image data;
   (c) determining a distance between the vehicle and the identified portion of the trailer;
   (d) determining a perspective based on the determined distance;
   (e) generating, with a controller included in the vehicle, a view of the trailer based on the image data, the view having the determined perspective;
   (f) displaying the generated view; and
   (g) repeating (c) through (f) as the vehicle nears the trailer, wherein an angle of the determined perspective relative to a driving surface of the vehicle changes as the vehicle gets closer to the trailer,
   wherein (e) includes generating a first view having a first perspective of approximately 45° from the driving surface of the vehicle and repeating (e) includes generating a second view having a second perspective of approximately 0° from the driving surface of the vehicle.

2. The method of claim 1, wherein identifying the portion of the trailer includes
   displaying the image data; and
   receiving a manual selection of the portion of the trailer.

3. The method of claim 1, wherein identifying the portion of the trailer includes automatically, with the controller, identifying the portion of the trailer by identifying a predetermined shape within the image data.

4. The method of claim 1, wherein identifying the portion of the trailer includes automatically, with the controller, identifying a predefined marker within the image data.

5. The method of claim 1, wherein repeating (c) through (f) includes repeating (c) through (f) until the determined distance is equal to or less than a predetermined minimum distance.

6. The method of claim 1, further comprising displaying the identified portion of the trailer and receiving confirmation of the identified portion.

7. The method of claim 1, wherein determining the distance between the vehicle and the identified portion of the trailer includes determining the distance based on the image data.

8. The method of claim 1, wherein repeating (c) includes automatically adjusting the determined distance based on movement of the vehicle.

9. The method of claim 1, wherein determining the perspective includes accessing a table mapping each of a plurality of distances to a predetermined perspective and generating the view based on the predetermined perspective included in the table for the one of the plurality of distances corresponding to the determined distance.

10. The method of claim 1, wherein (e) includes generating the first view when the vehicle is located more 5.0 meters from the trailer and repeating (e) includes generating the second view when the vehicle is located less than 1.0 meter from the trailer.

11. The method of claim 1, wherein repeating (e) includes continuously generating the view as the vehicle gets closer to the trailer.

12. The method of claim 1, wherein generating the view includes modifying the image data without modifying a physical position of an image capture device capturing the image data.

13. A system for assisting a driver when coupling a vehicle to a trailer, the system comprising:
   an image capture device configured to capture image data of an area to the rear of the vehicle;
   a user interface included in the vehicle; and at least one controller configured to
(a) obtain the image data,
(b) identify at least a portion of the trailer based on the image data,
(c) determine a distance between the vehicle and the identified portion of the trailer,
(d) determine a perspective based on the determined distance,
(e) generate a view of the trailer based on the image data, the view having the determined perspective, and
(f) display the view on the user interface,
wherein the at least one controller is configured to repeat (c) through (f) as the vehicle nears the trailer, wherein an angle of the determined perspective relative to a driving surface of the vehicle changes as the vehicle gets closer to the trailer,
wherein the at least one controller is configured to generate the view by generating a first view having a first perspective of approximately 45° from the driving surface of the vehicle and is configured to repeat (e) by generating a second view having a second perspective of approximately 0° from the driving surface of the vehicle.

14. The system of claim 13, wherein the user interface includes a touchscreen and wherein the at least one controller is configured to identify the portion of the trailer by displaying the image data on the touchscreen and receiving a manual selection of the portion of the trailer from the touchscreen.

15. The system of claim 13, wherein the at least one controller is configured to determine the perspective by accessing a table mapping each of a plurality of distances to a predetermined perspective and selecting the perspective based on one predetermined perspective included in the table associated with one of the plurality of distances corresponding to the determined distance.

16. The system of claim 13, wherein the at least one controller is configured to generate the first view when the vehicle is located more 5.0 meters from the trailer and generate the second view when the vehicle is located less than 1.0 meter from the trailer.

17. The system of claim 13, wherein the at least one controller is configured to repeat (d) by continuously changing the perspective as the vehicle gets closer to the trailer.

18. The system of claim 13, wherein the at least one controller is configured to generate the view of the trailer by modifying the image data without modifying a physical position of the image capture device.

19. A system for assisting a driver when coupling a vehicle to a trailer, the system comprising:
an image capture device configured to capture image data of an area to the rear of the vehicle;
a user interface included in the vehicle; and
at least one controller configured to
(a) obtain the image data,
(b) identify at least a portion of the trailer based on the image data,
(c) determine a distance between the vehicle and the identified portion of the trailer,
(d) determine a perspective based on the determined distance,
(e) generate a view of the trailer based on the image data, the view having the determined perspective, and
(f) display the view on the user interface,
wherein the at least one controller is configured to repeat (c) through (f) as the vehicle nears the trailer, wherein an angle of the determined perspective relative to a driving surface of the vehicle changes as the vehicle gets closer to the trailer,
wherein the at least one controller is configured to generate the view by generating a first view having a first perspective of approximately 45° to approximately 90° from the driving surface of the vehicle and is configured to repeat (e) by generating a second view having a second perspective of approximately 0° from the driving surface of the vehicle.

* * * * *